US012695021B2

(12) United States Patent
Granato et al.

(10) Patent No.:     US 12,695,021 B2
(45) Date of Patent:          Jul. 28, 2026

(54) SYMMETRIC SPLIT TRANSFORMER FOR EMI REDUCTION

(71) Applicant: Analog Devices International Unlimited Company, Limerick (IE)

(72) Inventors: Maurizio Granato, Milan (IT); Giovanni Frattini, Travaco' Siccomario (IT); Pietro Giannelli, Milan (IT); Keith W. Bennett, Grand Isle, VT (US)

(73) Assignee: Analog Devices International Unlimited Company, Limerick (IE)

( * ) Notice: Subject to any disclaimer, the term of this patent is extended or adjusted under 35 U.S.C. 154(b) by 449 days.

(21) Appl. No.: 17/100,716

(22) Filed: Nov. 20, 2020

(65) Prior Publication Data

US 2022/0165476 A1     May 26, 2022

(51) Int. Cl.
*H01F 27/28*          (2006.01)
*H01F 27/29*          (2006.01)
(Continued)

(52) U.S. Cl.
CPC ......... *H01F 27/2804* (2013.01); *H01F 27/29* (2013.01); *H01F 27/34* (2013.01);
(Continued)

(58) Field of Classification Search
CPC ...... H01F 27/2804; H01F 27/29; H01F 27/34; H01F 2027/2819; H01F 2027/2814;
(Continued)

(56) References Cited

U.S. PATENT DOCUMENTS

| 3,034,074 | A | 5/1962 | Perkins |
| 3,098,201 | A | 7/1963 | Smedema et al. |

(Continued)

FOREIGN PATENT DOCUMENTS

| CN | 203219181 | U | 9/2013 |
| CN | 103903835 | A | 7/2014 |

(Continued)

OTHER PUBLICATIONS

Costa, Analysis of Integrated Transformers and Its Application to RFIC Design. Doctoral Thesis. University of Barcelona. Oct. 2002; 140 pages.

(Continued)

*Primary Examiner* — Tuyen T Nguyen
(74) *Attorney, Agent, or Firm* — Schwegman Lundberg & Woessner, P.A.

(57)          ABSTRACT

Disclosed herein is a symmetric transformer in the context of a DC-DC isolated converter. The symmetric transformer reduces or eliminates asymmetry in the distribution of parasitic capacitance across the isolation barrier going from one end to another end of a primary coil, and as a result, undesirable electromagnetic interference (EMI) due to common mode dipole emission across the isolation barrier may be reduced.

In some embodiments, a primary winding is split into separate first and second coils, with a serial impedance connected in between the first and second coils. The transformer is symmetric in the sense that a capacitive coupling of the first coil to a secondary winding is the same as a capacitive coupling of the second coil to the secondary winding, such that common mode EMI may be reduced.

14 Claims, 13 Drawing Sheets

(51) Int. Cl.
    *H01F 27/34*         (2006.01)
    *H02M 3/335*       (2006.01)

(52) U.S. Cl.
    CPC ... *H02M 3/33523* (2013.01); *H02M 3/33592* (2013.01); *H01F 2027/2819* (2013.01)

(58) Field of Classification Search
    CPC ...... H01F 27/2823; H01F 27/40; H01F 30/10; H01F 27/36; H01F 27/28; H02M 3/33523; H02M 3/33592; H02M 1/123; H02M 1/44; H02M 3/003; H02M 3/01; H02M 3/26
    See application file for complete search history.

(56)           References Cited

U.S. PATENT DOCUMENTS

| | | | |
|---|---|---|---|
| 3,168,715 | A | 2/1965 | Woodworth |
| 3,689,710 | A | 9/1972 | Colardelle et al. |
| 4,245,177 | A | 1/1981 | Schmitz |
| 5,162,982 | A | 11/1992 | Mentler |
| 5,742,897 | A | 4/1998 | Plowdrey et al. |
| 6,185,114 | B1 | 2/2001 | Matsumoto et al. |
| 6,529,389 | B2 | 3/2003 | Perlick et al. |
| 6,940,233 | B2 | 9/2005 | Gray |
| 7,005,969 | B2 | 2/2006 | Fisher et al. |
| 7,298,633 | B2 | 11/2007 | Yasumura |
| 7,525,822 | B2 | 4/2009 | Aso et al. |
| 7,697,251 | B2 | 4/2010 | Karam |
| 7,697,306 | B2 | 4/2010 | Nakahori |
| 7,856,219 | B2 | 12/2010 | Dupuis |
| 8,154,118 | B2 | 4/2012 | Kanazawa et al. |
| 8,891,262 | B2 | 11/2014 | Metzler |
| 9,479,070 | B2 | 10/2016 | van der Merwe |
| 10,333,742 | B1 * | 6/2019 | Bhagwat ............ H04L 25/0298 |
| 10,574,149 | B2 | 2/2020 | Angelin |
| 10,742,123 | B1 * | 8/2020 | Sigamani ................ H02M 3/01 |
| 2008/0164941 | A1 * | 7/2008 | Lee ....................... H03F 1/3211 |
| | | | 330/195 |
| 2010/0079233 | A1 | 4/2010 | Koprivnak et al. |
| 2013/0262884 | A1 | 10/2013 | Yu |
| 2014/0177291 | A1 | 6/2014 | Wang et al. |
| 2014/0347154 | A1 * | 11/2014 | Schmelzer .......... H01F 27/2876 |
| | | | 336/170 |
| 2018/0040415 | A1 | 2/2018 | Katagiri et al. |
| 2020/0082977 | A1 | 3/2020 | Ishihara |
| 2020/0211765 | A1 | 7/2020 | Okazaki et al. |
| 2020/0295122 | A1 | 9/2020 | Yun et al. |
| 2021/0408919 | A1 | 12/2021 | Sigamani |
| 2022/0165477 | A1 | 5/2022 | Frattini et al. |

FOREIGN PATENT DOCUMENTS

| | | | | |
|---|---|---|---|---|
| CN | 105810385 | A | 7/2016 | |
| CN | 108206636 | A | 6/2018 | |
| CN | 110277920 | A * | 9/2019 | ........... H02M 3/335 |
| CN | 111669056 | A * | 9/2020 | ........... H01F 30/10 |
| DE | 2430808 | A1 | 1/1976 | |
| EP | 2549645 | A1 * | 1/2013 | ........... H01F 27/343 |
| EP | 2549646 | A1 * | 1/2013 | ........... H01F 27/42 |
| EP | 3048618 | A1 * | 7/2016 | ........... H01F 17/02 |
| EP | 3 349 224 | A1 | 7/2018 | |
| EP | 3 540 973 | A1 | 9/2019 | |
| GB | 880475 | A | 10/1961 | |
| JP | 2004040901 | A * | 2/2004 | |
| JP | 2009017714 | A | 1/2009 | |
| KR | 10 2018 0007177 | A | 1/2018 | |
| WO | WO-2013012373 | A1 * | 1/2013 | ........... H01F 27/42 |
| WO | WO 2016/005526 | A1 | 1/2016 | |
| WO | WO 2020/195275 | A1 | 10/2020 | |
| WO | WO 2020/195276 | A1 | 10/2020 | |

OTHER PUBLICATIONS

U.S. Appl. No. 17/100,753, filed Nov. 20, 2020, Frattini et al.

Extended European Search Report dated Apr. 21, 2022 in connection with European Application No. 21208598.9.

Extended European Search Report dated Jul. 19, 2022 in connection with European Application No. 21208875.1.

European Communication pursuant to Article 94(3) EPC dated Jun. 10, 2024 in connection with European Application No. 21208875.1.

EP21208875.1, Jun. 10, 2024, European Communication pursuant to Article 94(3) EPC.

"Chinese Application Serial No. 202111372995.0, Office Action mailed Feb. 28, 2025", W/O English Translation, 7 pgs.

"Chinese Application Serial No. 202111372995.0, Response filed Jun. 27, 2025 to Office Action mailed Feb. 28, 2025", W/English Claims, 12 pgs.

"Chinese Application Serial No. 202111372995.0, Office Action mailed Nov. 26, 2025", w/ English translation, 8 pgs.

"Chinese Application Serial No. 202111372995.0, Response filed Jan. 6, 2026 to Office Action Mailed Nov. 26, 2025", w/ English Claims, 12 pgs.

\* cited by examiner

SYMMETRIC SPLIT TRANSFORMER FOR EMI REDUCTION

FIELD OF THE DISCLOSURE

The present disclosure generally relates to radio-frequency (RF) transformers, and in particular to isolation transformers used in an isolated DC-DC converter.

BACKGROUND

A transformer is typically used to couple two sides of an electrical system, sometimes called a primary side and a secondary side. The two sides are often electromagnetically coupled and separated by a galvanic isolation barrier.

A transformer can be used to transfer information or energy across the galvanic isolation barrier, to form an isolated communication channel, or to supply power to a different portion of a circuit for safety and/or data integrity considerations. Both data flow and power flow can be uni- or bi-directional, depending on the application requirements.

Some isolated DC-DC converters include a driver that drives a primary winding of a transformer to transmit power to a secondary winding of the transformer across an isolation barrier. A rectifier converts the received voltage at the secondary winding of the transformer into an output DC voltage.

There are many construction technologies and topologies for transformers. Generally, transformers include conductive wires wound to form loops which generate and collect the magnetic field on the respective sides of the isolation barrier. Optionally, there may be a magnetic material provided in a transformer to help direct and contain the magnetic field.

Miniature transformers or planar transformers are transformers having conductors that are integrated in a semiconductor package, for example embedded in a substrate.

When a transformer is stimulated with an electric signal, the magnetic field coupling between the two sides may be represented in a simplified circuit model by coupled inductors, while the electric field across the isolation barrier may be represented by capacitors across the barrier. When a transformer operates with signals having a frequency in the MHz to GHz range or RF signals, the capacitive effect between both sides of the isolation barrier becomes more pronounced compared to low frequency operation. The design of a circuit system employing a RF transformer sometimes may model the transformer as a single electromagnetic device that is an inductive device with a parasitic capacitive effect.

SUMMARY OF THE DISCLOSURE

Disclosed herein is a symmetric transformer in the context of a DC-DC isolated converter. The symmetric transformer reduces or eliminates asymmetry in the distribution of parasitic capacitance across the isolation barrier going from one end to another end of a primary coil, and as a result, undesirable electromagnetic interference (EMI) due to common mode dipole emission across the isolation barrier may be reduced.

In some embodiments, a primary winding is split into separate first and second coils, with a serial impedance connected in between the first and second coils. The transformer is symmetric in the sense that a capacitive coupling of the first coil to a secondary winding is the same as a capacitive coupling of the second coil to the secondary winding, such that common mode EMI may be reduced.

In some embodiments, an isolated DC-DC converter is disclosed. The DC-DC converter comprises a primary winding having a first coil in series with a second coil. The first coil is coupled between first and second terminals, the second coil is coupled between third and fourth terminals. The DC-DC converter further comprises a secondary winding coupled between fifth and sixth terminals. A capacitance of the first coil to the secondary winding equals a capacitance of the second coil to the secondary winding. An impedance is coupled between the second and third terminals and in series with the first and second coils.

In some embodiments, an isolated DC-DC converter is disclosed. The DC-DC converter comprises a substrate and a transformer. The transformer comprises a first coil and a second coil. Each of the first and second coils comprises at least one coil portion disposed in a first plane parallel to a surface of the substrate. The first coil is coupled between first and second terminals. The second coil is coupled between third and fourth terminals, and comprises a plurality of coil portions. The DC-DC converter further comprises a secondary winding disposed in a second plane parallel to and separated from the first plane by the substrate. The secondary winding is coupled between fifth and sixth terminals. A capacitance of the first coil to the secondary winding equals a capacitance of the second coil to the secondary winding. The DC-DC converter further comprises at least one bridge connecting a pair of adjacent coil portions in the second coil; and a pair of conductive structures each coupled to the third and fourth terminals, respectively. The at least one bridge is disposed in a third plane parallel to and offset from the first plane. The pair of conductive structures are disposed in the third plane.

In some embodiments, an isolated DC-DC converter is disclosed. The DC-DC converter comprises a primary winding comprising a first coil and a second coil; a secondary winding isolated from the primary winding. A capacitance of the first coil to the secondary winding equals a capacitance of the second coil to the secondary winding. The DC-DC converter further comprises a current path through the first coil, an impedance between the first and second coils, and the second coil.

BRIEF DESCRIPTION OF DRAWINGS

Various aspects and embodiments of the disclosure will be described with reference to the following figures. It should be appreciated that the figures are not necessarily drawn to scale. Items appearing in multiple figures are indicated by the same reference number in all the figures in which they appear. For purposes of clarity, not every component may be labeled in every drawing.

DETAILED DESCRIPTION

Some aspects of the present disclosure are directed to a symmetric transformer design in the context of a DC-DC isolated converter. The symmetric transformer reduces or eliminates asymmetry in the distribution of parasitic capacitance across the isolation barrier going from one end to another end of a primary coil, and as a result, undesirable electromagnetic interference (EMI) due to common mode dipole emission across the isolation barrier may be reduced.

A first aspect relates to a split transformer design in which a primary winding is split into separate first and second coils, with a serial impedance connected in between the first and second coils. The transformer is symmetric in the sense that a capacitive coupling of the first coil to a secondary winding is the same as a capacitive coupling of the second coil to the secondary winding, such that common mode EMI may be reduced. The serial impedance may be a single capacitor serving as capacitance in a resonant LLC network for a DC-DC converter, saving cost and reducing complexity compared to circuit designs having a pair of capacitors provided on the outside of the primary winding. In some embodiments, the transformer is a planar transformer spanning multiple metal layers, and the serial impedance may be connected to a pair of center-tapped terminals in the primary winding.

A second aspect relates to a split planar transformer design in which the primary winding of a transformer is split into at least a first coil and a second coil, each occupying a different area side-by-side on a substrate. The transformer is symmetric in the sense that a capacitive coupling of the first coil to a secondary winding is the same as a capacitive coupling of the second coil to the secondary winding, such that common mode EMI may be reduced. In some embodiments, each coil may include stacked spiral coil portions in more than one metal planes, such that upon a current flow magnetic field generated in the coil portions overlap to increase inductive density across the isolation barrier, leading to higher inductance for a given area. Furthermore, in some embodiments the first coil and the second coil may have opposite spiral directions such that their generated magnetic fields have opposite polarity. As a result, far field radiation effect from the transformer may be reduced.

Figure 1:
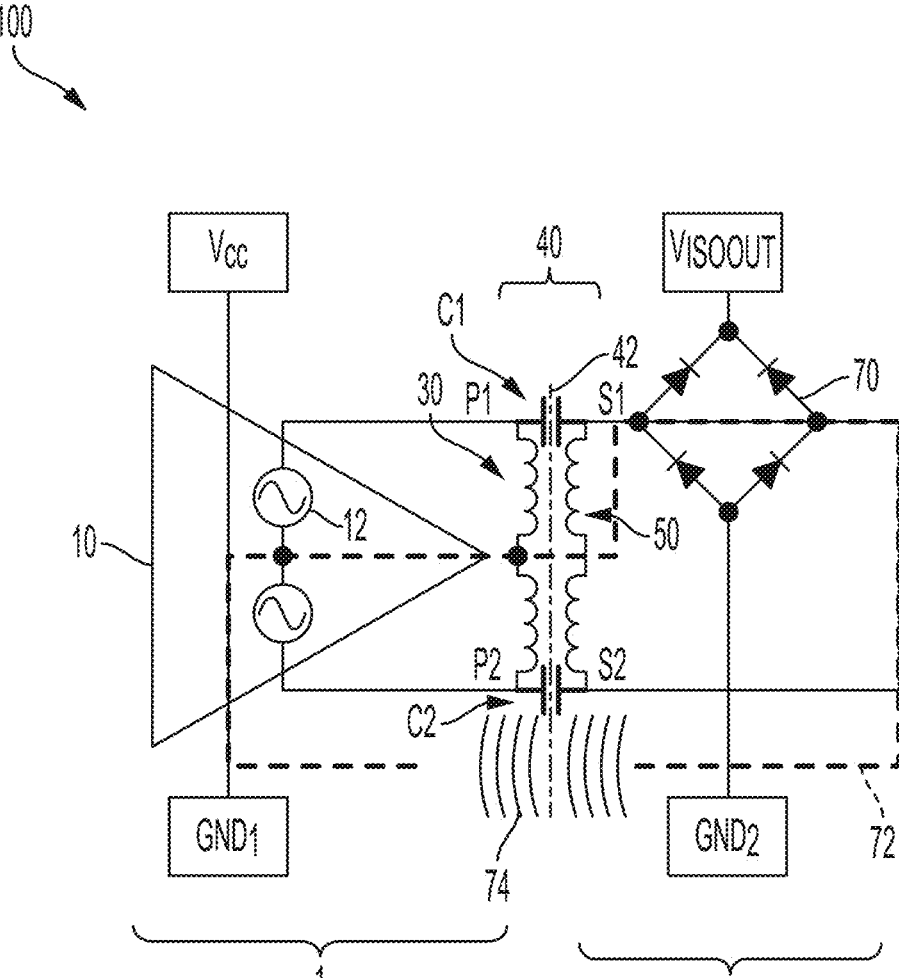
FIG. 1 is a schematic diagram that illustrates an example of electromagnetic interference in an isolated DC-DC converter.

FIG. 1 is a schematic diagram that illustrates an example of electromagnetic interference in an isolated DC-DC converter. FIG. 1 shows a DC-DC converter 100 that includes a primary side 1 having a driver 10 and a primary winding 30 of a transformer 40. The DC-DC converter 100 further includes a rectifier 70 and a secondary winding 50 of transformer 40 in a secondary side 2.

In the DC-DC converter 100, driver 10 is powered by a DC voltage $V_{cc}$ to drive the primary winding 30 of the transformer 40 between terminals P1 and P2. The primary winding 30 is electromagnetically coupled to the secondary winding 50 across an isolation barrier 42, which may be formed of a dielectric. The secondary winding 50 is coupled to rectifier 70 via terminals S1 and S2 to convert signals received in the secondary winding 50 into an output DC voltage $V_{ISOOUT}$. Driver 10 may take any suitable form, and in some embodiments may be a resonating circuit. In a preferred embodiment, driver 10 may be a full bridge driver.

Referring back to FIG. 1, which shows distributed parasitic capacitances C1 and C2 across the isolation barrier 42. It should be appreciated that while two capacitor symbols C1 and c2 are used, they are a simplified representation of distributed capacitive coupling from one end P1 of the primary winding 30 to another end P2 of the primary winding, with C1 representing the capacitive coupling between the portion of the primary winding adjacent terminal P1 and the secondary winding, and vice versa for C2.

As shown in FIG. 1, when transformer 40 is stimulated by alternative current (AC) driving signals 12 from driver 10, a common mode AC current 72 is injected across the isolation barrier 42. Common mode current 72 does not have a physical return path, and will create a dipole antenna between the voltage domain in primary side 1 and the voltage domain in secondary side 2, which can radiate and generate electromagnetic interference (EMI) emissions 74.

The inventors recognized and appreciated that that the net capacitive current across the isolation barrier is related to asymmetries in the DC-DC converter system. For example, if the driving signals are fully differential and the capacitances across the barrier are balanced (e.g. C1 is equal to C2), then capacitive currents injected closer to terminal P1 cancels out capacitive currents injected closer to terminal P2, and the net sum is 0.

It is recognized that asymmetries that may lead to poor EMI performance may include but not limited to: asymmetry of the active switches in the transformer driver and rectifier; asymmetry of the timing of driver and rectifier; asymmetry of the transformer and asymmetry of the impedance connecting the power stage (driver and rectifier) to the transformer. Aspects of the present disclosure is related to reducing asymmetry of the transformer, namely, asymmetry in the capacitance distribution (e.g. a C1 that is different from C2 in FIG. 1) to improve EMI performance by reducing common mode dipole emissions.

Figure 2A:
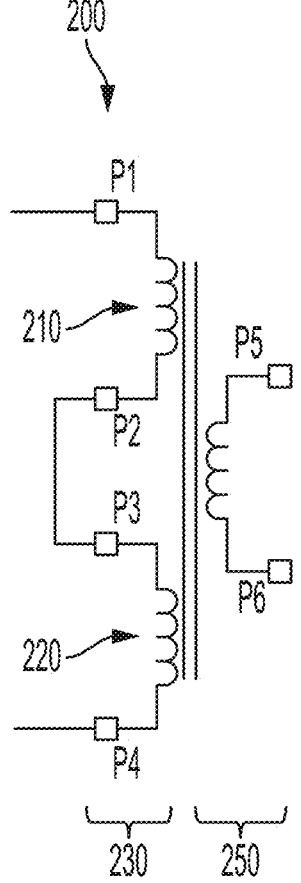
FIG. 2A is a simplified circuit diagram of an exemplary symmetric transformer, according to a first aspect of the present disclosure.

FIG. 2A is a simplified circuit diagram of an exemplary symmetric transformer, according to a first aspect of the present disclosure. FIG. 2A shows a transformer 200 having a primary winding 230 and a secondary side 250. The primary winding is split into two serially-connected coils 210, 220. First coil 210 is coupled between terminals P1, P2. Second coil 220 is coupled between terminals P3, P4. The secondary winding 230 is coupled between terminals P5, P6. According to some embodiments, transformer 200 is symmetric in that a capacitance C1 between the first coil 210 and secondary winding 250 equals a capacitance C2 between the second coil 220 and secondary winding 250.

While FIG. 2A only depicts a secondary winding having a single coil, it should be appreciated that the split coil design in primary winding 230 may be applied to the secondary winding as well to provide a symmetric transformer.

Figure 2B:
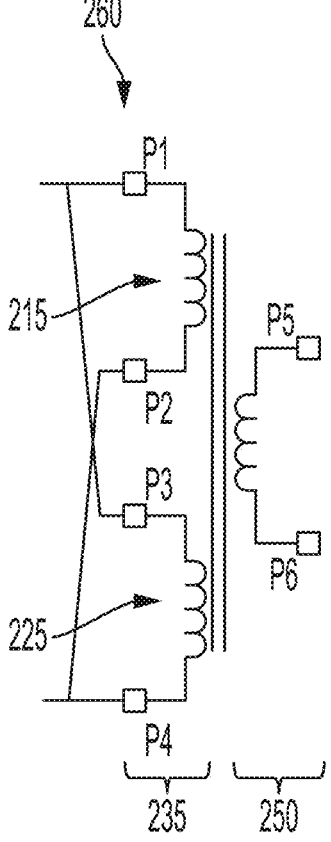
FIG. 2B is a simplified circuit diagram showing a symmetric transformer that is a variation of the transformer in FIG. 2A.

FIG. 2B is a simplified circuit diagram showing a symmetric transformer that is a variation of the transformer in FIG. 2A. In FIG. 2B, transformer 260 has a primary winding 235 and a secondary winding 250. Primary winding 235 is split into two separate coils 215, 225 that each has an equal capacitance to the secondary winding 250. Transformer 260 differs from transformer 200 in FIG. 2A in that instead of connected in series, the two coils 215 and 225 are connected in parallel, such that each of the coils is coupled between terminals P1 and P2. According to an aspect, connecting coils within the primary winding in parallel may increase the magnetic field and hence the inductive coupling in the transformer.

Figure 3:
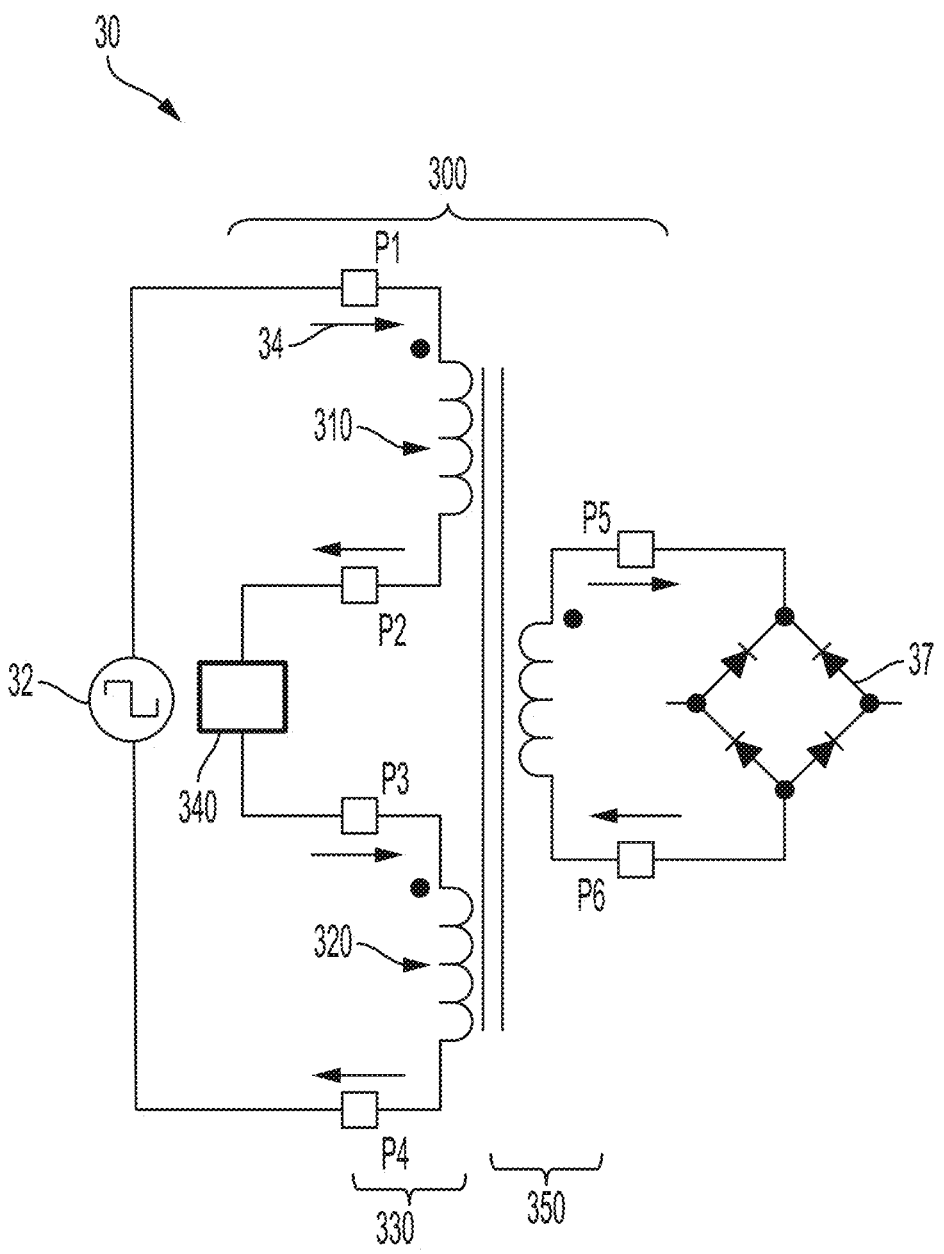
FIG. 3 is a simplified circuit diagram showing a DC-DC converter having a symmetric transformer, in accordance with some embodiments.

FIG. 3 is a simplified circuit diagram showing a DC-DC converter having a symmetric transformer, in accordance with some embodiments. Shown in FIG. 3 is a DC-DC converter 30 having a driver 32, a transformer 300, and a rectifier 37. Driver 32 is coupled to terminals P1, P4 of a primary winding 330 of transformer 300 to drive a RF signal through the primary winding. Rectifier 37 is coupled to terminals P5, P6 of a secondary winding 350 of transformer 300 to convert signals received in the secondary winding 350 into an output DC voltage.

Still referring to FIG. 3, transformer 300 is a symmetric transformer having a split primary winding 330 that includes first coil 310, second coil 320, and an impedance 340 that are in series along one current path 34. Transformer 300 is symmetric in that a capacitance C1 between the first coil 310 and secondary winding 350 equals a capacitance C2 between the second coil 320 and secondary winding 350.

In FIG. 3, first coil 310 is coupled between terminals P1, P2. The serial impedance 340 is coupled between terminals P2, P3. Second coil 320 is coupled between terminals P3, P4. Serial impedance 340 may comprise a capacitor. In some embodiments, DC-DC converter 30 may be a resonant DC-DC converter, and serial capacitance 340 when combined with the inductance L of the transformer 300 form a symmetric LLC resonant network that is driven by driver 32. An example of DC-DC converter that has an LLC resonant network based on a transformer is described in U.S. Pat. No. 10,003,267 to Zhao et. al, the entirety of which is herein incorporated by reference. It should be appreciated that aspects of the present disclosure are not limited to providing a serial capacitance, and that serial impedance 340 may comprise other reactive components.

Figure 4A:
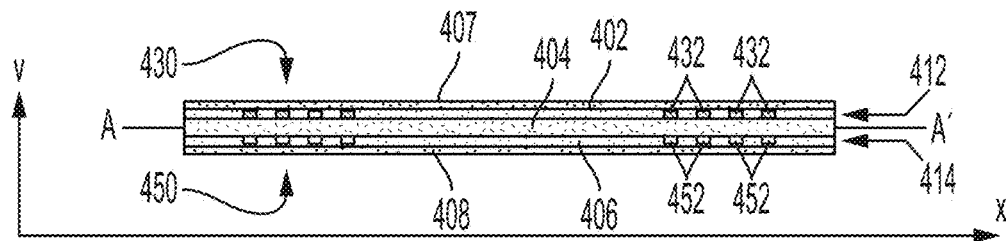
FIG. 4A and FIG. 4B are a cutaway view diagram and a top view diagram, respectively, of a planar transformer that can be used to implement the symmetric transformer in the DC-DC converters of FIGS. 1-3, in accordance with some embodiments.
Figure 4B:
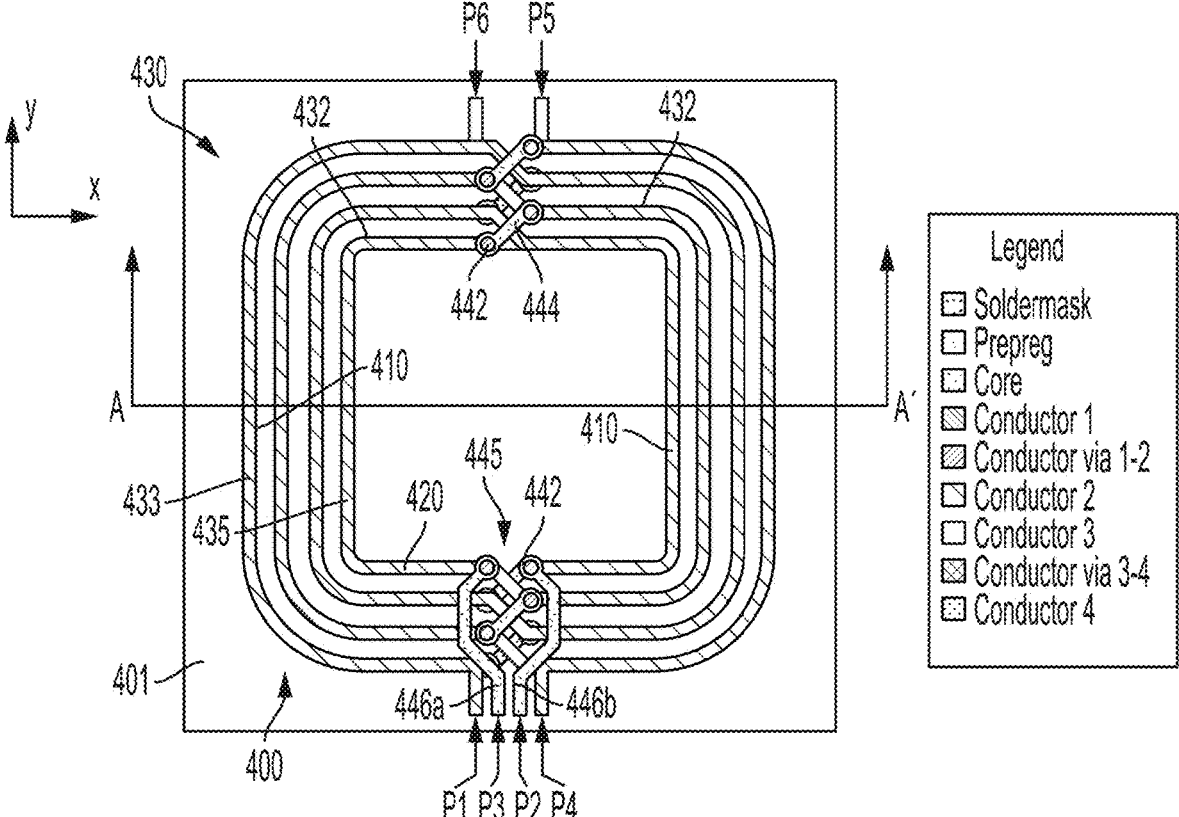

FIG. 4A and FIG. 4B are a cutaway view diagram and a top view diagram, respectively, of a planar transformer that can be used to implement the symmetric transformer in the DC-DC converters of FIGS. 1-3, in accordance with some embodiments.

FIG. 4B shows a transformer 400 having a primary winding 430 and a secondary winding 450 on a substrate 401. Substrate 401 may be a printed circuit board (PCB), and additional circuit components, while not shown, may be provided on the PCB. In some embodiments, substrate 401 may be integrated in a same package as a DC-DC converter using semiconductor manufacturing techniques known in the field.

FIG. 4A is a cutaway view of substrate 401 along A-A' in FIG. 4B, and shows that primary winding 430 and secondary winding 450 each comprises a plurality of coil portions 432, 452 that are disposed on opposing surfaces of a core layer 404 of substrate 401. Core layer 404 comprises an insulative dielectric material, and serves as galvanic isolation between the primary and secondary windings.

Coil portions 432 in the primary winding 430 comprise conductors that are coplanar in a first plane 412. Each of the coil portions 432 may comprise a conductive material such as metal that are be fabricated on a top surface of core layer 404 by any suitable fabrication method known in the field, such as but not limited to masked deposition, etching, or combinations thereof. In such embodiments, plane 412 may be a metal layer of the process flow. As viewed in FIG. 4B, coil portions 432 may be elongated conductors of substantially the same width, although uniform width is not a requirement and any suitable dimension may be used.

Still referring to FIG. 4B, conductors in primary winding 430 are wound within plane 412 and extend from terminal P1 toward P4 (see e.g. the circuit diagram in FIG. 3). The primary winding may be shaped as a spiral that extends in a clockwise fashion beginning at terminal P1, with conductors in coil portion 433 that initially shrink in enclosed area to avoid shorting to itself. When the primary winding reaches a smallest enclosed area, it continues to extend clockwise while extending outward via coil portions 435 with increasing enclosed area towards terminal P4. To avoid shorting of coil portion 433 with coil portions 435, vias 442 and bridges 444 are provided such that coil portions 435 may crisscross coil portion 433 at a different plane from plane 412 (not shown in FIG. 4A). Details of the vias 442 and bridges 444 will be discussed below with respect to the examples in FIGS. 5A-5C.

Referring back to FIG. 4A, which shows that secondary winding 450 coupled between terminals P5, P6 and having coil portions 452 that are coplanar in a second plane 414. In some embodiments, the second plane 414 may be another metal layer in the substrate 401. As shown in FIGS. 4A and 4B, coil portions 452 in the secondary winding are aligned vertically with coil portions 432 in the primary winding 432. Because capacitance is proportional to areas and distance between two adjacent conductive objects, when the distances between pairs of coil portions are maintained to be a uniform spacing based on the thickness of the core layer 404, and when the lateral dimensions of coil portions 432 and 452 are matched to each other, the distributed capacitive coupling between conductors in coil portions 432 and 452 may be maintained to be uniform throughout the length of the primary winding 430. It should be appreciated that while obfuscated in FIG. 4B, secondary winding 450 may additionally comprise vias and bridges that extend out to a plane different from plane 414 to allow winding coil portions 452 to crisscross each other without shorting in a similar way to the primary winding 430.

Referring back to FIG. 4B, which shows that the primary winding 430 has a break 445 splitting the primary winding into two coils. A first coil 410 comprises coil portion 433 that is coupled to terminal P1, and further to terminal P2 via conductive structure 446a. A second coil 420 comprises coil portions 435 that is coupled to terminal P4, and further to terminal P3 via conductive structure 446b. In this embodiment, the break 445 is selected such that a capacitance between the first coil 410 to the secondary winding 450 equals a capacitance between the second coil 420 to the secondary winding 450, and the transformer 400 is symmetric in this regard.

It should be appreciated that break 445 is not necessarily situated at the geometric center of the primary winding 430, even though break 445 appears to be situated at the bottom center of primary winding 430 along the x-direction. The exact geometry of where primary winding 430 is split into first and second coils may be determined during the design phase of a symmetric transformer. By way of example, using simulation methods known in the field, a difference in distributed capacitance between the first coil to the secondary winding, and between the second coil to the secondary winding may be iteratively calculated while the coil geometry is adjusted, until the transformer becomes symmetric. Besides the location of a break in the primary winding, the size, dimension, dielectric isolation barrier thickness are all among exemplary parameters of the coils that can be adjusted to achieve symmetry, as is known by a person skilled in the field of RF transformers.

While not shown in FIG. 4B, in a preferred embodiment an impedance such as impedance 340 in FIG. 3 may be coupled to terminals P2, P3, and be serially connected to the first coil 410 and second coil 420 in a current path from terminal P1 to terminal P4.

FIG. 4A also shows an insulative layer 402 disposed above core layer 404, and an insulative layer 406 disposed below core layer 404. Insulative layers 402, 406 encapsulates primary and secondary windings 430 and 450, respectively, and provides mechanical support and electrical isolation to conductors disposed on the core layer 404. Insulative layers 402, 406 may comprise any suitable dielectric materials known in the field of PCB manufacturing, such as but not limited to oxide, nitride, ceramics, polymers and mixtures thereof. In a preferred embodiment, insulative layers 402, 406 comprise a prepreg layer.

FIG. 4A additional shows an insulative layer 407 in contact with a surface of insulative layer 402, and an insulative layer 408 in contact with a surface of insulative layer 406. Layers 407, 408 may comprise a polymer material, for example a solder mask.

It should be appreciated that substrate 401 is illustrated as comprising a composition of five layers 402, 404, 406, 407, 408 for illustrative purpose only, and that additional materials and layers may be present. It is also not a requirement that core layer 404 and insulative layer 402, 406 be of different compositions. Furthermore, while FIG. 4A only illustrates one metal layer on either surface of core layer 404, additional metal layers may be provided in the substrate 401.

Figure 5A:
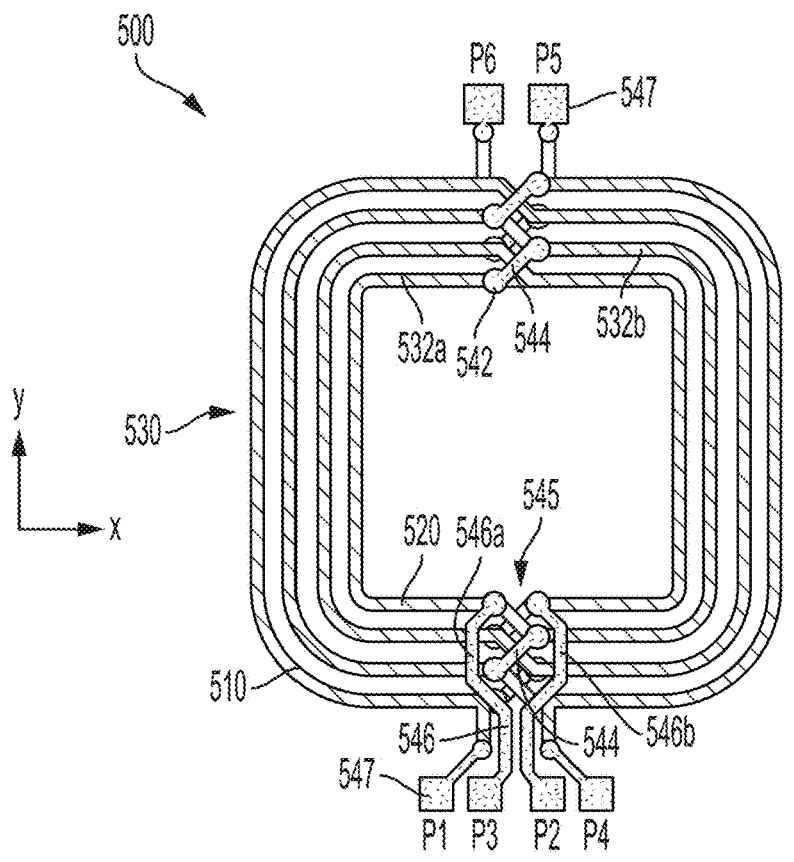
FIGS. 5A-5C are top view and perspective view diagrams of an interleaved planar transformer, in accordance with some embodiments.
Figure 5B:
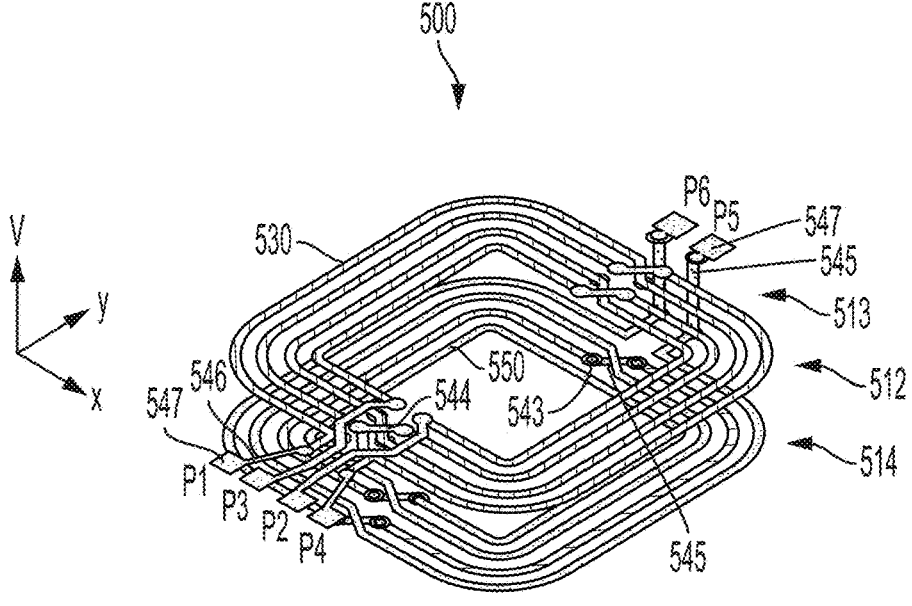
Figure 5C:
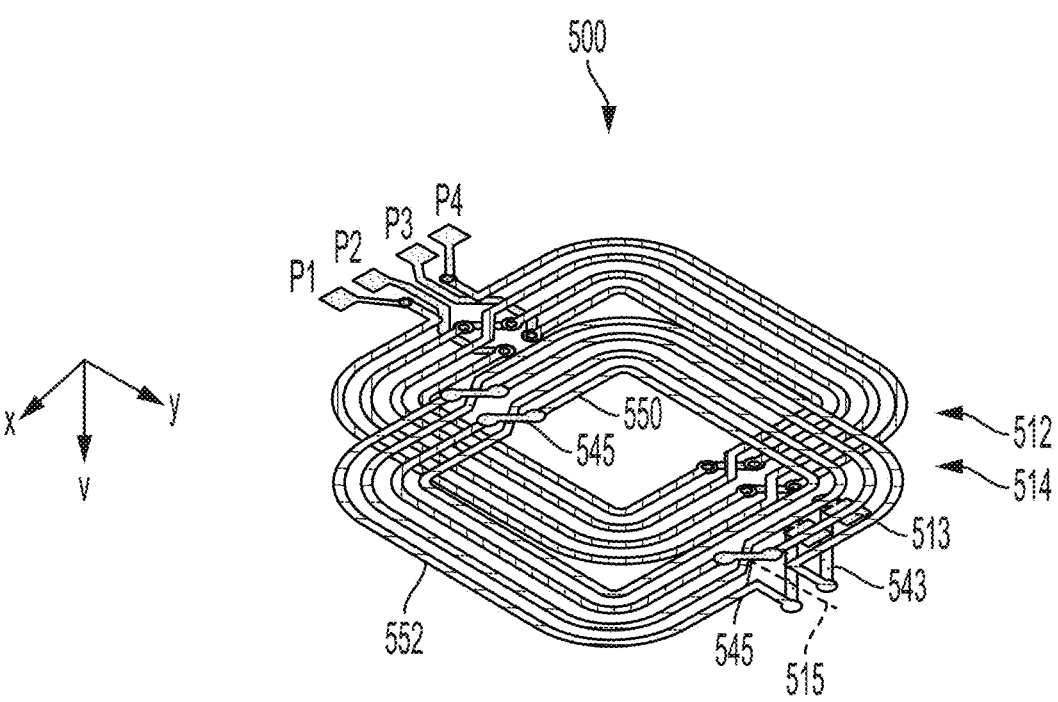

FIGS. 5A-5C are top view and perspective view diagrams of an interleaved planar transformer, in accordance with some embodiments. FIGS. 5A-5C show a planar transformer 500 having a primary winding 530 coupled between terminals P1 and P4, and a secondary winding 550 separated and isolated from the primary winding 530 by a core layer (not shown for simplicity). Secondary winding 550 is coupled between terminals P5 and P6.

FIG. 5A shows that primary winding 530 is split into a first coil 520 and a second coil 530. The first coil 520 is coupled to terminals P1 and P3 via traces 546 and pads 547. The second coil 530 is coupled to terminals P3 and P4 via traces 546 and pads 547. Traces 546 are elongated conductors that fan-out in an x-y plane to coupled the respective coils to pads 547 serving as terminals in order to accommodate the different pitch and sizing between the pads and conductors in the coils.

As shown in FIG. 5B, the primary winding 530 comprise coil portions primarily in a first metal layer 512, while traces 546 and pads 547 are disposed in a second metal layer 513 that is offset and above the first metal layer 512. Vias 542 are provided to vertically interconnect a trace 546 with corresponding coil portions in the metal layer below.

Transformer 500 is a symmetric transformer, with a break 545 in the primary winding such that a capacitance between the first coil 510 to the secondary winding 550 equals a capacitance between the second coil 520 to the secondary winding 550. While not shown in FIG. 5A, in a preferred embodiment a serial impedance such as impedance 340 in FIG. 3 is provided and coupled to terminals P2, P3, and be serially connected to the first coil 510 and second coil 520 in a current path from terminal P1 to terminal P4.

As shown in FIG. 5A, second coil 520 comprises a plurality of coil portions such as coil portions 532a, 532b. Second coil 520 crisscrosses first coil 510 using a bridge 544 that is connected to adjacent coil portions 532a, 532b using a pair of vertical vias 542. Bridge 544 is disposed in a different plane than first metal layer 512. In a preferred embodiment, bridge 544 comprises conductors in the same second metal layer 513 as traces 546 and pads 547. In the embodiment shown, at least one bridge 544 is enclosed on at least two sides by a pair of traces 546a, 546b that connect to terminals P3 and P2.

FIGS. 5A and 5B show that secondary winding 550 have coil portions 552 that are vertically aligned with coil portions in the primary winding 530. FIG. 5C illustrates a flipped view point of transformer 500 compared to the perspective in FIG. 5B, and shows that coil portions in the secondary winding 550 are disposed in a third plane or third metal layer 514. Bridges 545 are provided in the secondary winding 550 to allow crisscross between coil portions 552 without shorting to each other. In some embodiments, bridges 545 comprise conductors disposed in a fourth metal layer 515 that is offset from metal layer 514 and away from the metal layers 512 and 513 of the primary winding.

As shown in FIG. 5A, the two terminals of the secondary winding P5 and P6 are provided at the top of transformer 500, opposite terminals P1 and P4 for the primary winding along the y-direction. In a preferred embodiment, terminals P5, P6 are implemented as pads 547 that are disposed in the second metal layer 513, the same layer as pads 547 for terminals P1-P4, as well as traces 546. FIGS. 5B and 5C show that a pair of vertical interconnects 543 passes through the insulative materials and connects coil portions in the third metal layer 514 of the secondary winding to respective pads 547 serving as terminals P5, P6. In such an embodiment, all six terminals are disposed in the same metal plane on one side of the substrate to make the pads more accessible for electrical connections to other components.

While the embodiment shown in FIGS. 5A-5C involve conductors in four metal layers 512, 513, 514, 515, it should be appreciated that aspects of the present application are not so limited as one or more components may be disposed in additional metal layers. It should also be appreciated that while the embodiments show a bridge or a trace/pad that is routed above or below a coil portion to avoid shorting, both underpass and overpass relative to the coil portion may be used for such routing and aspects of the present disclosure is not so limited.

Figures 6A, 6B:
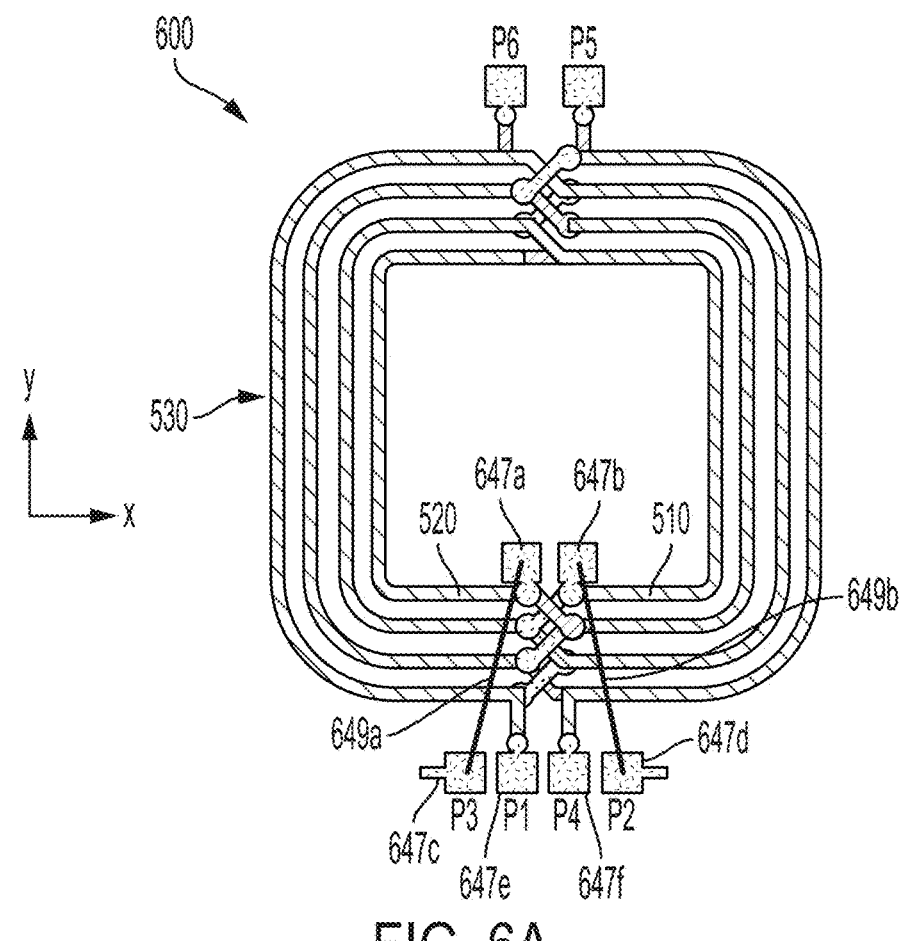
FIGS. 6A and 6B are top view and perspective view diagrams of another exemplary interleaved planar transformer 600 that is a variation of the planar transformer 500 shown in FIGS. 5A-5C.

FIGS. 6A and 6B are top view and perspective view diagrams of another exemplary interleaved planar transformer 600 that is a variation of the planar transformer 500 shown in FIGS. 5A-5C. Transformer 600 is similar in many aspects to transformer 500, with like components marked with identical reference numbers. Transformer 600 differs from transformer 500 in that instead of using traces to couple a serial impedance in the primary winding 530, a pair of bond wires 649a, 649b are provided.

As shown in FIG. 6A, an end of the first coil 510 is coupled to a bond pad 647b, and the bond pad 647b is connected to bond pad 647d acting as terminal P4 via bond wire 649b. Similarly, an end of the second coil 520 is coupled to a bond pad 647a, and the bond pad 647a is connected to bond pad 647c acting as terminal P3 via bond wire 649a. In some embodiments, the two terminals P1 and P4 may be directly connected to ends of coil portions in the first coil and the second coil without using traces. This is shown in the example in FIG. 6A, where bond pads 647e, 647f act as terminals P1, P4, respectively and are vertically interconnected using vias to conductors in respective first coil 510 and second coil 520 in the first metal layer 512. In some embodiments, pads 647a, 647b, 647c, 647d, 647e and 647f are disposed in the second metal layer 513.

Figure 7:
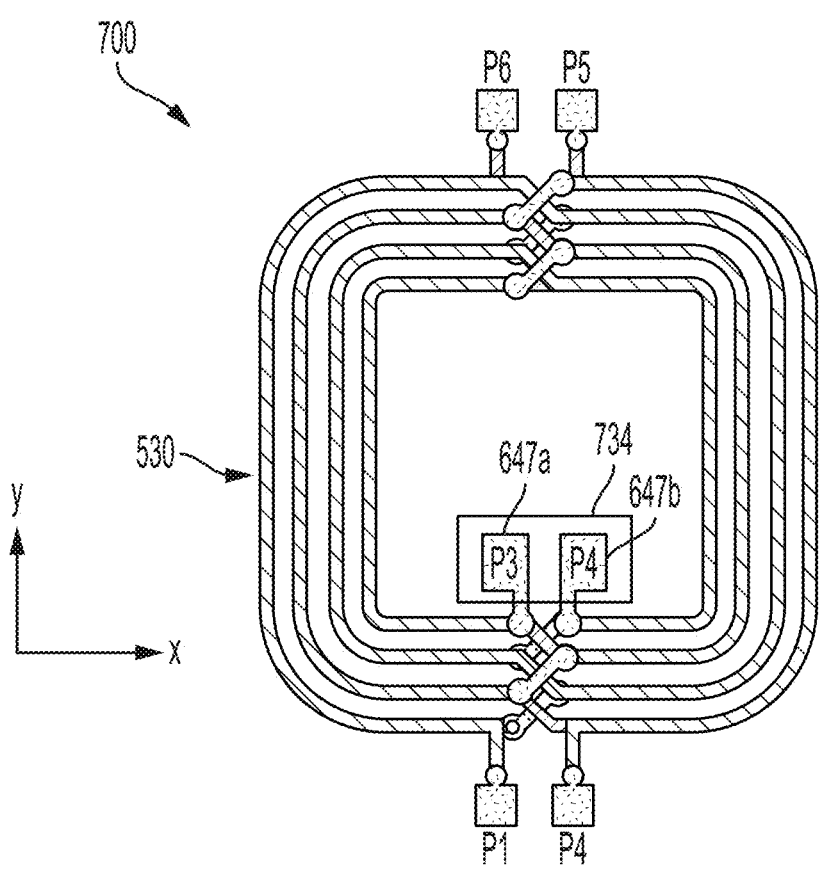
FIG. 7 is a top view diagram of an exemplary interleaved planar transformer 700 that is a variation of the planar transformer 600 shown in FIGS. 6A and 6B.

FIG. 7 is a top view diagram of an exemplary interleaved planar transformer 700 that is a variation of the planar transformer 600 shown in FIGS. 6A and 6B. Transformer 700 is similar in many aspects to transformer 600, with like components marked with identical reference numbers. Transformer 700 differs from transformer 600 in that instead of using bond wires to couple a serial impedance with bond pads 6147a, 617b, a discreet component 734 may be directly mounted to the bond pads, as shown in FIG. 7. Discreet component 734 may be a passive component such as a capacitor, and when mounted on bond pads 617a, 617b, is serially connected within the primary winding 530. In a preferred embodiment, component 734 is a surface-mountable component and the mounting may be performed using soldering.

While embodiments discussed thus far in relation to FIGS. 4-7 are based on planar transformers integrated in a substrate, aspects of the present disclosure are not so limited. For example, a symmetric split transformer with a serial impedance may be implemented in a non-planar coil topology, such as but not limited to a toroid or solenoid.

Figure 8:
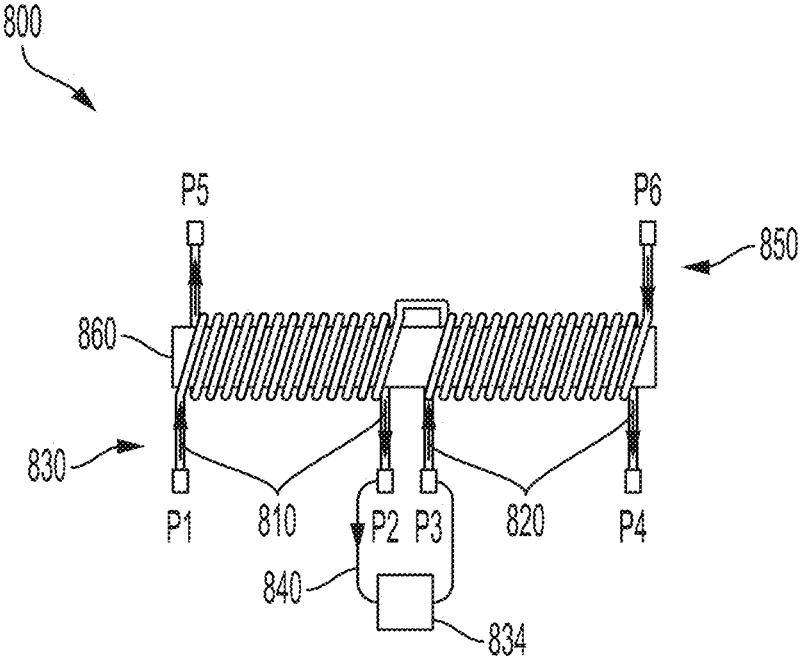
FIG. 8 is a schematic diagram of a symmetric split transformer implemented in a solenoid structure, in accordance with some embodiments.

FIG. 8 is a schematic diagram of a symmetric split transformer implemented in a solenoid structure, in accordance with some embodiments. In FIG. 8, solenoid transformer 800 has a primary winding 830, a secondary winding 850 both wound up around a magnetic core 860. Because conductors of the primary winding 830 and secondary winding 850 are intertwined but isolated from each other, there is a distributed capacitance between the primary winding and the secondary winding along the length of the primary winding 830 from terminal P1 to terminal P4.

The primary winding 830 is split into a first coil 810 coupled between terminals P1 and P2 and a second coil 820 coupled between terminals P3 and P4, such that a capacitance between the first coil 810 to the secondary winding 850 equals a capacitance between the second coil 820 to the secondary winding 850. An impedance 834 is coupled to terminals P2 and P3, such that the first coil 810, second coil 820, and the impedance 834 are in series with each other and that a current path 840 flows through each of the first coil 810, impedance 834 and second coil 820.

A second aspect of the present disclosure relates to a planar transformer design having a primary winding that is split into a first coil and a second coil each enclosing a different area side-by-side on a substrate. In some embodiments, the secondary winding is also split into a third coil and a fourth coil that each is aligned underneath respective first and second coils of the primary winding, thereby splitting the planar transformer into two half-transformers that are connected in series.

Figure 9:
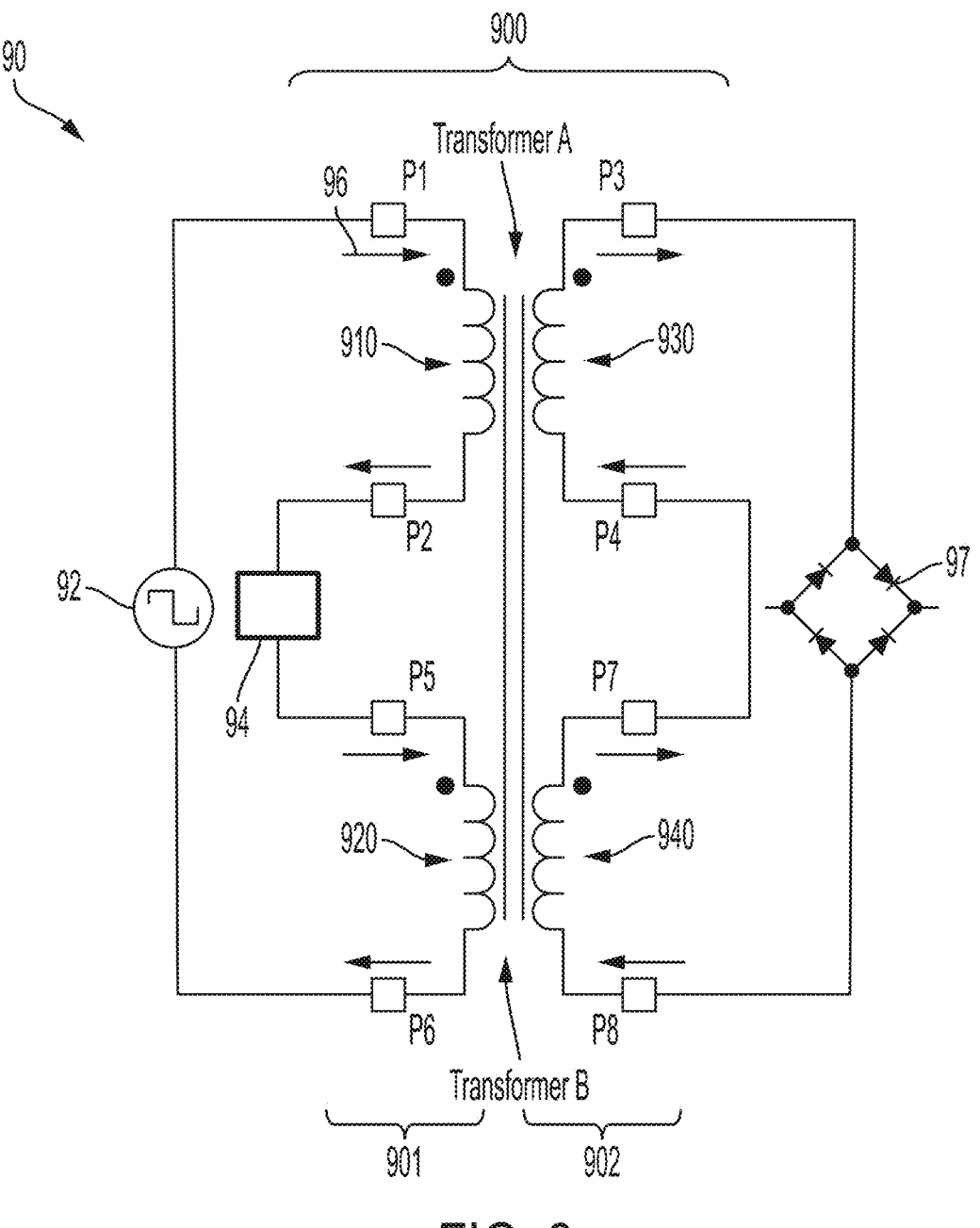
FIG. 9 is a simplified circuit diagram showing a DC-DC converter having a symmetric transformer, in accordance with the second aspect of the present disclosure.

FIG. 9 is a simplified circuit diagram showing a DC-DC converter having a symmetric transformer, in accordance with the second aspect of the present disclosure. Shown in FIG. 9 is a DC-DC converter 90 having a driver 92, a transformer 900, and a rectifier 97. Driver 92 is coupled to terminals P1, P6 of a primary winding 901 of transformer 900 to drive a RF signal through the primary winding. Rectifier 97 is coupled to terminals P3, P8 of a secondary winding 850 of transformer 900 to convert signals received in the secondary winding 902 into an output DC voltage.

Still referring to FIG. 9, primary winding 901 of transformer 900 is split into a first coil 910, second coil 920, and an impedance 94 that are in series along current path 96. Secondary winding 902 of transformer 900 is split into a third coil 930, and a fourth coil 940 connected in series. Transformer 900 is symmetric in that a capacitance C1 between the first coil 910 and third coil 930 equals a capacitance C2 between the second coil 920 and the fourth coil 940.

In FIG. 9, first coil 910 is coupled between terminals P1, P2. The serial impedance 94 may be similar to impedance 340 as shown in FIG. 3, and is coupled between terminals P2, P5. Second coil 920 is coupled between terminals P5, P4. Third coil 930 is coupled between terminals P3, P4, while fourth coil 940 is coupled between terminals P7, P8. Second coil 920 is coupled between terminals P5, P4. In a preferred embodiment, serial impedance 94 comprises a capacitor.

Still referring to FIG. 9. As first coil 910 is inductively coupled to third coil 930, the pair forms a half-transformer or transformer A. Similarly, second coil 920 forms a transformer B with fourth coil 940.

Figure 10A:
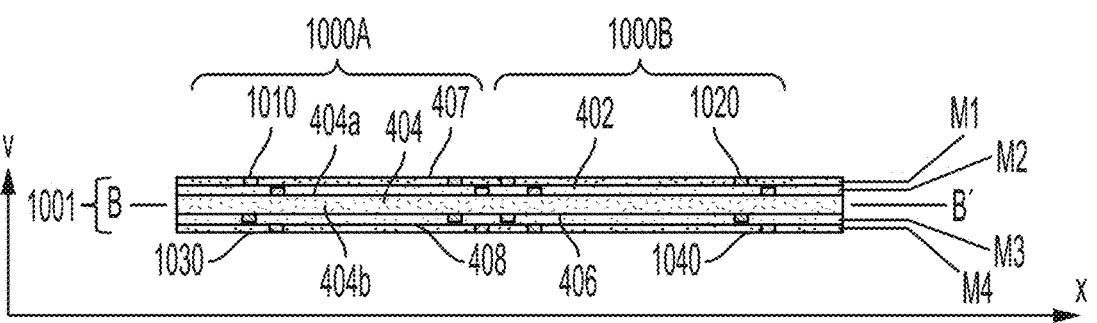
FIG. 10A and FIG. 10B are a cutaway view diagram and a top view diagram, respectively, of a split planar transformer that can be used to implement the transformer as shown in FIG. 9, in accordance with some embodiments.
Figure 10B:
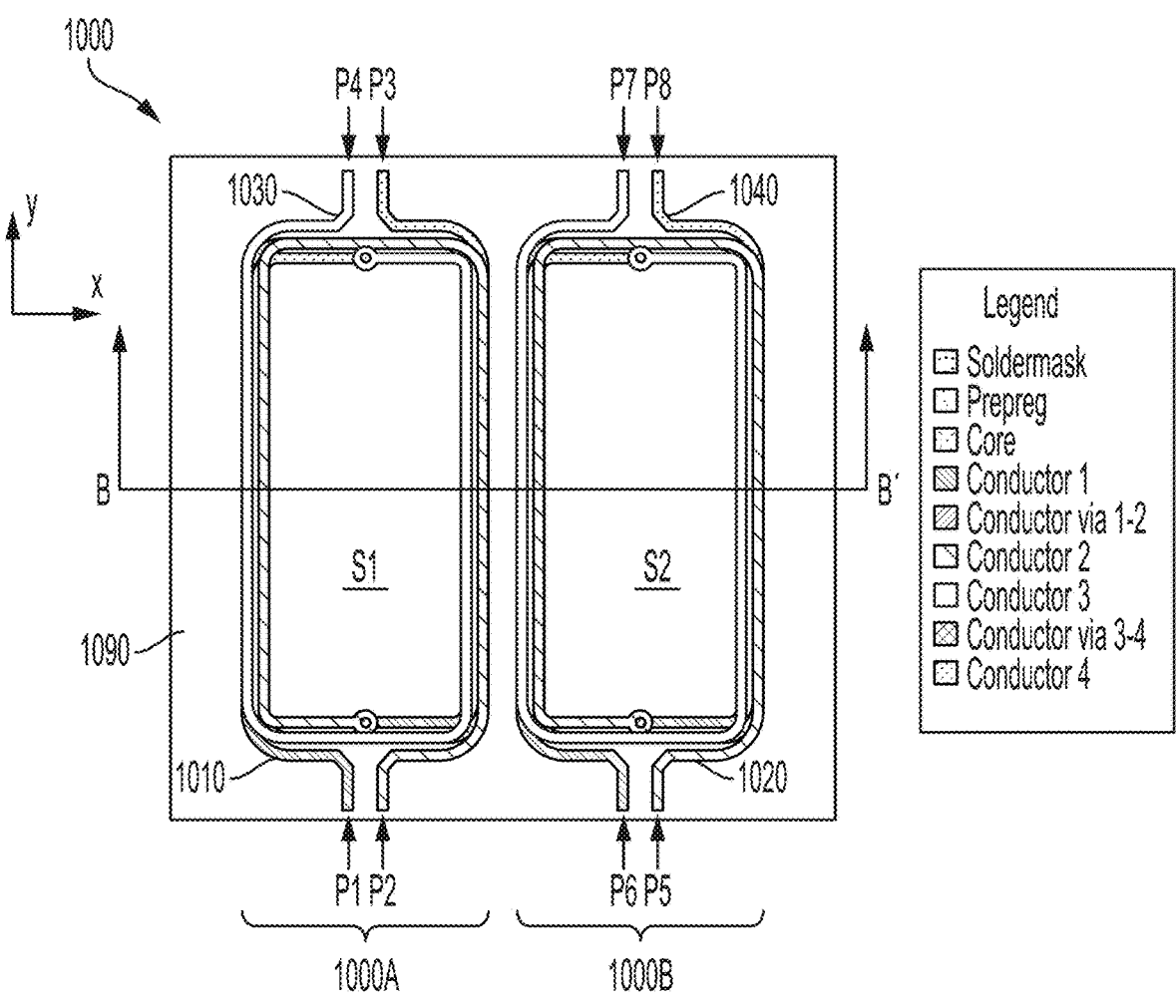

FIG. 10A and FIG. 10B are a cutaway view diagram and a top view diagram, respectively, of a split planar transformer that can be used to implement the transformer as shown in FIG. 9, in accordance with some embodiments.

FIG. 10A is a cutaway view of a substrate 1090 along B-B' in FIG. 10B. FIG. 10A shows a transformer 1000 having a split primary winding that comprises a first coil 1010 and a second coil 1020. Transformer 1000 also have a secondary winding that comprises a third coil 1030 and a fourth coil 1040. Each of the first coil 1010 and the second coil 1020 comprise conductors disposed in two metal planes M1 and M2. Each of the third coil 1030 and the fourth coil 1040 comprise conductors disposed in two metal planes M3 and M4.

Still referring to FIG. 10A. The coils are disposed in a substrate 1090, which may be similar to substrate 401 as shown in FIG. 4A. In the example shown, substrate 1090 includes an insulative core layer 404. Core layer 404 comprises an insulative dielectric material, and serves as galvanic isolation between the primary and secondary windings. First coil 1010 and second coil 1020 of the primary winding are disposed on a first surface 404a of the core layer 404. Third coil 1030 and fourth coil 1040 are disposed on a second surface 404b of the core layer 404.

FIG. 10A additional shows an insulative layer 407 in contact with a surface of insulative layer 402, and an insulative layer 408 in contact with a surface of insulative layer 406. Layers 407, 408 may comprise a polymer material, for example a solder mask.

Turning now to the top view diagram in FIG. 10B, which shows that the first coil 1010 encloses an area S1 on the first surface 404*a* of the core layer, while the second coil 1020 encloses an area S2 on the first surface 404*a* that is side-by-side to but separated from the area S1. Thus the transformer 1000 is split into two half-transformers 1000A and 1000B that each occupy a different area S1, S2 on a surface of the semiconductor substrate 1090. Within transformer 1000A, at least a portion of first coil 1010 is vertically aligned with and overlapped with at least a portion of the third coil 1030. Similarly, within transformer 1000B, at least a portion of second coil 1020 is vertically aligned with and overlapped with at least a portion of the fourth coil 1040.

In FIG. 10B, the two half-transformers 1000A, 1000B are disposed side-by-side, and each shaped like an elongated racetrack, with a longer leg along the y-direction than an leg along the x-direction. While there are no limitation as to the shape and size of the primary winding, secondary winding, and each half-transformer, having the two half-transformers 1000A, 1000B each shaped like a half-width transformer as shown in FIG. 10B takes up less footprint on the substrate 1090.

Figures 10C, 10D:
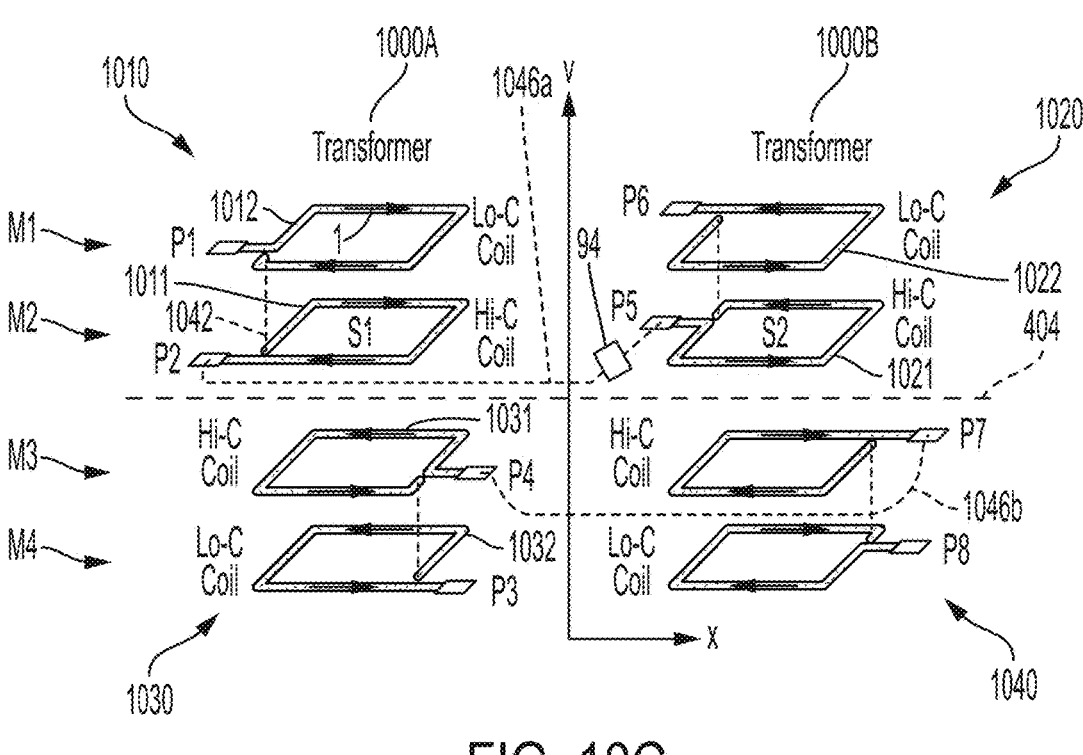
FIG. 10C is a perspective view diagram showing coil portions in different metal planes that are included in each coil of the transformer 1000 in FIG. 10A.
FIG. 10D is a series of cutaway view diagrams showing coil portions in the four different metal planes of FIG. 10C.

The operation and connection between terminals within transformer 1000 will be explained with reference to FIGS. 10C and 10D. FIG. 10C is a perspective view diagram showing coil portions in different metal planes that are included in each coil of the transformer 1000 in FIG. 10A. FIG. 10D is a series of cutaway view diagrams showing coil portions in the four different metal planes of FIG. 10C.

On the primary side of half-transformer 1000A, FIGS. 10C, 10D shows that first coil 1010 comprises at least two coil portions 1011, 1012 each disposed in a respective metal layer M1, M2. Because the first coil 1010 spans two different metal layers, a via 1042 is used to vertically interconnect the coil portions 1011, 1012 such that first coil 1010 comprises a spiral having two turns. While coil portions in two metal layers are shown in FIG. 10C, first coil 1010 may comprise more than two layers of coil portions, as more coil portions means higher number of turns within the first coil and higher inductance values.

When a clockwise current I flows from terminal P1 through the first coil 1010 towards terminal P2, a magnetic field is generated within area S1 that is pointing downward, with the strength of the magnetic field proportional to the number of turns in the first coil. As a result, compared to single-metal layer coils, transformer 1000 may generate multiple times higher magnetic field within the same unit area on the substrate. One benefit of the multiple metal plane coil design in transformer 1000 is that each of a plurality of metal planes may be used to host spiral coils without the need to utilize a metal plane to form bridges as underpass or overpass, such as bridge 444 shown in FIG. 4B. As a result, a high inductance can be implemented within a relatively small footprint on a substrate, given the quadratic impact of the number of turns on the amount of transformer inductance.

On the primary side of half-transformer 1000B, FIGS. 10C, 10D that second coil 1020 comprises at least two coil portions 1021, 1022 that spirals in the opposite direction compared to the first coil 1010, such that when current I flows through interconnect 1046 toward terminal P6 via terminal P5, there is a counterclockwise current generating a magnetic field in the upward direction within area S2. Thus when a current flows serially through the primary coils 1010, 1020 of transformer 1000, magnetic fields generated within half-transformers 1000A and 1000B point to opposing directions. As a result of the two magnetic field canceling each other, far field radiation from transformer 1000 may be reduced.

Returning to the secondary side of half-transformer 1000A. FIGS. 10C, 10D show that third coil 1030 comprises at least two coil portions 1031, 1032 each disposed in a respective metal layer M3, M4. While first coil 1010 is isolated from third coil 1030 by the core layer 404, there is high capacitive coupling between coil portion 1011 on layer M2 (connected to P2) and coil portion 1031 on M3 (connected to P4) compared to a low capacitive coupling between coil portion 1012 on M1 and coil portion 1032 on M4 which are spaced farther apart vertically. In some embodiments, such nodes will be driven by equal and opposite voltages, hence cancelling the impact of such capacitors on common mode currents. In some embodiments, transformer 1000 can be designed to be symmetric such that a capacitance between first coil 1010 and third coil 1030 equals a capacitance between second coil 1020 and fourth coil 1040.

In some embodiments, because of symmetry in the transformer 1000, terminal pairs P1/P6, P3/P8, P2/P5 and P4/P7 will be driven by equal and opposite voltages, hence cancelling the impact of such capacitors on common mode currents across the isolation barrier and reducing EMI emissions.

Referring back to FIG. 10C. The various terminals P1-P8 of transformer 1000 may be implemented in any suitable ways, such as but not limited to pads, traces, or other conductive structures within substrate 1090 as shown in FIG. 10B. The number of accessible terminals makes transformer 1000 a flexible design. For example, in the embodiment shown in FIG. 10C, first coil 1010 and second coil 1020 may be serially connected by an interconnect 1046. Interconnect 1046*a* may further couple an impedance 94 serially in between terminals P2 and P5. In the same embodiment, an interconnect 1046*b* may serially couple third coil 1030 to fourth coil 1040 by connecting terminal P4 to terminal P7.

In an alternative embodiment, the primary side coils of transformer 1000 may be reconfigured to have parallel connection between the two half-coils 1010 and 1020, for example in a configuration similar to the primary side of FIG. 2B.

Figure 11:
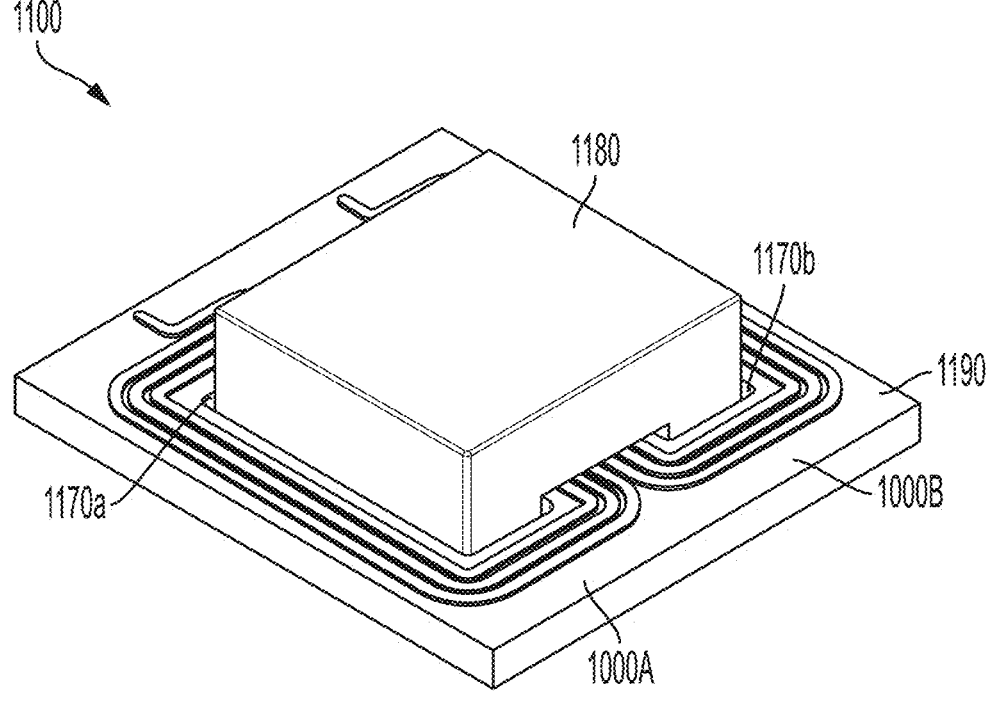
FIG. 11 is a plan view schematic diagram of a split planar transformer that is a variation of the transformer in FIG. 10B with an added magnetic material, in accordance with some embodiments.

FIG. 11 is a plan view schematic diagram of a split planar transformer that is a variation of the transformer in FIG. 10B with an added magnetic material, in accordance with some embodiments. FIG. 11 shows two halves 1000A, 1000B of transformer 1000 disposed in a substrate 1190. The two halves 1000A, 1000B are magnetically coupled via a magnetic material 1180 disposed on the substrate 1190 to enhance the overall inductance of the primary and secondary side, hence increasing the amount of coil quality factors. In some embodiments, magnetic material 1180 may comprise one or more magnetic material cores shared between the two transformer halves 1000A, 1000B.

In the embodiment shown in FIG. 11, a single magnetic core 1180 is disposed through a first aperture 1170*a* and a second aperture 1170*b* in the substrate 1190. The first and second apertures each passes through an area enclosed by the coils within respective half transformers 1000A, 1000B, such that the magnetic core 1180 couples the two half transformer magnetically.

Having thus described several aspects of at least one embodiment of this technology, it is to be appreciated that various alterations, modifications, and improvements will readily occur to those skilled in the art.

For example, while aspects of a symmetric transformer are discussed in the context of application in a DC-DC converter, the disclosed transformers may be used in any suitable RF transformer applications and are not limited to be used in a DC-DC converter, or with a soft-switching scheme.

Various aspects of the technology may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, aspects of the technology may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

What is claimed is:

1. An isolated DC-DC converter, comprising:
   a driver circuit coupled to a DC power source, the driver circuit to drive an AC signal based on the DC power source;
   a primary winding coupled to the driver circuit to receive the driven AC signal, the primary winding having a first coil in series with a second coil, the first coil coupled between first and second terminals, the second coil coupled between third and fourth terminals, wherein at least one coil portion of each of the first coil and the second coil is disposed in a first plane;
   a secondary winding coupled between fifth and sixth terminals, wherein a capacitance of the first coil to the secondary winding equals a capacitance of the second coil to the secondary winding;
   an impedance comprising a single capacitor, the impedance coupled between the second and third terminals and connected in series with the first and second coils in a current path from the first terminal to the fourth terminal; and
   a rectifier circuit to convert signals received in the secondary winding to generate an output DC signal,
   wherein the driver circuit is configured to drive the AC signal to cause a resonant operation with the impedance and an inductance of the primary winding forming an LLC resonant network.

2. The isolated DC-DC converter of claim 1, further comprising a substrate, wherein
   the second coil comprises a plurality of coil portions disposed in the first plane, and
   the secondary winding comprises a plurality of coil portions disposed in a second plane parallel to and separated from the first plane by the substrate.

3. The isolated DC-DC converter of claim 2, wherein the second coil further comprises at least one bridge connecting a pair of adjacent coil portions in the second coil, wherein
   the at least one bridge is disposed in a third plane parallel to and offset from the first plane.

4. The isolated DC-DC converter of claim 3, wherein the impedance is coupled between a pair of conductive structures, each of the pair of conductive structures coupled to the third and fourth terminals, respectively, and wherein
   the pair of conductive structures are disposed in the third plane.

5. The isolated DC-DC converter of claim 4, wherein the pair of conductive structures comprise a pair of pads.

6. The isolated DC-DC converter of claim 5, wherein the pair of conductive structures further comprise a pair of traces.

7. The isolated DC-DC converter of claim 4, further comprising at least one bond wire coupled to the pair of conductive structures.

8. The isolated DC-DC converter of claim 2, wherein at least one coil portion in the second coil is aligned with at least one coil portion in the secondary winding along a vertical direction perpendicular to the first plane.

9. The isolated DC-DC converter of claim 3, wherein the fifth and sixth terminals are each connected to a pair of pads through a pair of vias, and wherein
   the pair of pads are disposed in the third plane.

10. The isolated DC-DC converter of claim 2, wherein the secondary winding comprises at least one bridge connecting a third coil portion to a fourth coil portion in the secondary winding, wherein
    the at least one bridge connecting the third coil portion to the fourth coil portion is disposed in a fourth plane parallel to and offset from the first plane.

11. An isolated DC-DC converter, comprising:
    a driver circuit coupled to a DC power source, the driver circuit to drive an AC signal based on the DC power source;
    a primary winding coupled to the driver circuit to receive the driven AC signal, the primary winding comprising a first coil and a second coil, wherein at least one coil portion of each of the first coil and the second coil is disposed in a first plane;
    a secondary winding isolated from the primary winding, wherein a capacitance of the first coil to the secondary winding equals a capacitance of the second coil to the secondary winding;
    a current path serially through the first coil;
    an impedance provided in the current path including a single capacitor between the first and second coils; and a rectifier circuit to convert signals received in the secondary winding to generate an output DC signal, wherein the driver circuit is configured to drive the AC signal to cause a resonant operation with the impedance and an inductance of the primary winding forming an LLC resonant network.

12. The isolated DC-DC converter of claim 11, further comprising a substrate, wherein the secondary winding comprises a plurality of coil portions disposed in a second plane parallel to and separated from the first plane by the substrate.

13. The isolated DC-DC converter of claim 12, wherein the second coil comprises a plurality of coil portions, and at least one bridge connecting a pair of adjacent coil portions in the second coil, wherein the at least one bridge is disposed in a third plane parallel to and offset from the first plane.

14. The isolated DC-DC converter of claim 13, wherein the impedance is coupled between a pair of pads, each of the pair of pads coupled to the first coil and the second coil, respectively, and wherein the pair of pads are disposed in the third plane.

\* \* \* \* \*